United States Patent
Leidel et al.

(10) Patent No.: US 11,494,296 B2
(45) Date of Patent: *Nov. 8, 2022

(54) MEMORY SHAPES

(71) Applicant: Micron Technology, Inc., Boise, ID (US)

(72) Inventors: John D. Leidel, McKinney, TX (US); Isom Crawford, Jr., Royse City, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/194,020

(22) Filed: Mar. 5, 2021

(65) Prior Publication Data

US 2021/0191848 A1 Jun. 24, 2021

Related U.S. Application Data

(63) Continuation of application No. 15/496,886, filed on Apr. 25, 2017, now Pat. No. 10,942,843.

(51) Int. Cl.
*G06F 12/02* (2006.01)
(52) U.S. Cl.
CPC ...... *G06F 12/0223* (2013.01); *G06F 12/0207* (2013.01); *G06F 2212/1016* (2013.01)
(58) Field of Classification Search
CPC .......... G06F 12/0223; G06F 12/0207
See application file for complete search history.

(56) References Cited

U.S. PATENT DOCUMENTS

| | | |
|---|---|---|
| 4,380,046 A | 4/1983 | Fung |
| 4,435,792 A | 3/1984 | Bechtolsheim |
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |

(Continued)

FOREIGN PATENT DOCUMENTS

| | | |
|---|---|---|
| CN | 102141905 | 8/2011 |
| EP | 0214718 | 3/1987 |

(Continued)

OTHER PUBLICATIONS

Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.

(Continued)

*Primary Examiner* — Chie Yew
(74) *Attorney, Agent, or Firm* — Brooks, Cameron & Huebsch, PLLC

(57) ABSTRACT

A user definition of a memory shape can be received and a multidimensional, contiguous, physical portion of a memory array can be allocated according to the memory shape. The user definition of the memory shape can include a quantity of contiguous columns of the memory array, a quantity of contiguous rows of the memory array, and a major dimension of the memory shape. The major dimension can correspond to a dimension by which to initially stride data stored in the memory shape.

20 Claims, 8 Drawing Sheets

(56) References Cited

U.S. PATENT DOCUMENTS

| | | |
|---|---|---|
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffman et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Fran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,181,698 B1 | 1/2001 | Hariguchi |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,533,245 B2 | 3/2003 | Takemoto |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Fran et al. |
| 7,054,178 B1 | 5/2006 | Shiah et al. |
| 7,061,817 B2 | 6/2006 | Raad et al. |
| 7,079,407 B2 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Gamey |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mokhlesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shimano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,873,272 B2 | 10/2014 | Lee |
| 8,964,496 B2 | 2/2015 | Manning |
| 8,971,124 B1 | 3/2015 | Manning |
| 9,015,390 B2 | 4/2015 | Klein |
| 9,047,193 B2 | 6/2015 | Lin et al. |
| 9,165,023 B2 | 10/2015 | Moskovich et al. |
| 9,195,657 B2 | 11/2015 | Oks et al. |
| 9,647,685 B1 | 5/2017 | Lachheb |
| 2001/0007112 A1 | 7/2001 | Porterfield |

(56) References Cited

U.S. PATENT DOCUMENTS

| | | |
|---|---|---|
| 2001/0008492 A1 | 7/2001 | Higashiho |
| 2001/0010057 A1 | 7/2001 | Yamada |
| 2001/0028584 A1 | 10/2001 | Nakayama et al. |
| 2001/0043089 A1 | 11/2001 | Forbes et al. |
| 2002/0059355 A1 | 5/2002 | Peleg et al. |
| 2003/0167426 A1 | 9/2003 | Slobodnik |
| 2003/0196062 A1* | 10/2003 | Valentin ............... G06F 9/5016 711/170 |
| 2003/0222879 A1 | 12/2003 | Lin et al. |
| 2003/0233511 A1* | 12/2003 | Kubo .................... G06F 13/28 711/E12.003 |
| 2004/0064671 A1 | 4/2004 | Patil |
| 2004/0073592 A1 | 4/2004 | Kim et al. |
| 2004/0073773 A1 | 4/2004 | Demjanenko |
| 2004/0085840 A1 | 5/2004 | Vali et al. |
| 2004/0095826 A1 | 5/2004 | Perner |
| 2004/0154002 A1 | 8/2004 | Ball et al. |
| 2004/0182930 A1 | 9/2004 | Nojiri |
| 2004/0205289 A1 | 10/2004 | Srinivasan |
| 2004/0240251 A1 | 12/2004 | Nozawa et al. |
| 2005/0015557 A1 | 1/2005 | Wang et al. |
| 2005/0078514 A1 | 4/2005 | Scheuerlein et al. |
| 2005/0097417 A1 | 5/2005 | Agrawal et al. |
| 2006/0047937 A1 | 3/2006 | Selvaggi et al. |
| 2006/0069849 A1 | 3/2006 | Rudelic |
| 2006/0146623 A1 | 7/2006 | Mizuno et al. |
| 2006/0149804 A1 | 7/2006 | Luick et al. |
| 2006/0181917 A1 | 8/2006 | Kang et al. |
| 2006/0215432 A1 | 9/2006 | Wickeraad et al. |
| 2006/0225072 A1 | 10/2006 | Lari et al. |
| 2006/0291282 A1 | 12/2006 | Liu et al. |
| 2007/0103986 A1 | 5/2007 | Chen |
| 2007/0171747 A1 | 7/2007 | Hunter et al. |
| 2007/0180006 A1 | 8/2007 | Gyoten et al. |
| 2007/0180184 A1 | 8/2007 | Sakashita et al. |
| 2007/0195602 A1 | 8/2007 | Fong et al. |
| 2007/0285131 A1 | 12/2007 | Sohn |
| 2007/0285979 A1 | 12/2007 | Turner |
| 2007/0291532 A1 | 12/2007 | Tsuji |
| 2008/0025073 A1 | 1/2008 | Arsovski |
| 2008/0037333 A1 | 2/2008 | Kim et al. |
| 2008/0052711 A1 | 2/2008 | Forin et al. |
| 2008/0137388 A1 | 6/2008 | Krishnan et al. |
| 2008/0165601 A1 | 7/2008 | Matick et al. |
| 2008/0178053 A1 | 7/2008 | Gorman et al. |
| 2008/0215937 A1 | 9/2008 | Dreibelbis et al. |
| 2009/0067218 A1 | 3/2009 | Graber |
| 2009/0154238 A1 | 6/2009 | Lee |
| 2009/0154273 A1 | 6/2009 | Borot et al. |
| 2009/0204784 A1 | 8/2009 | Favergeon-Borgialli |
| 2009/0254697 A1 | 10/2009 | Akerib |
| 2010/0067296 A1 | 3/2010 | Li |
| 2010/0091582 A1 | 4/2010 | Vali et al. |
| 2010/0172190 A1 | 7/2010 | Lavi et al. |
| 2010/0210076 A1 | 8/2010 | Gruber et al. |
| 2010/0226183 A1 | 9/2010 | Kim |
| 2010/0308858 A1 | 12/2010 | Noda et al. |
| 2010/0332895 A1 | 12/2010 | Billing et al. |
| 2011/0051523 A1 | 3/2011 | Manabe et al. |
| 2011/0063919 A1 | 3/2011 | Chandrasekhar et al. |
| 2011/0093662 A1 | 4/2011 | Walker et al. |
| 2011/0103151 A1 | 5/2011 | Kim et al. |
| 2011/0119467 A1 | 5/2011 | Cadambi et al. |
| 2011/0122695 A1 | 5/2011 | Li et al. |
| 2011/0140741 A1 | 6/2011 | Zerbe et al. |
| 2011/0219260 A1 | 9/2011 | Nobunaga et al. |
| 2011/0267883 A1 | 11/2011 | Lee et al. |
| 2011/0317496 A1 | 12/2011 | Bunce et al. |
| 2012/0005397 A1 | 1/2012 | Lim et al. |
| 2012/0017039 A1 | 1/2012 | Margetts |
| 2012/0023281 A1 | 1/2012 | Kawasaki et al. |
| 2012/0113128 A1 | 5/2012 | Ryu et al. |
| 2012/0120705 A1 | 5/2012 | Mitsubori et al. |
| 2012/0134216 A1 | 5/2012 | Singh |
| 2012/0134225 A1 | 5/2012 | Chow |
| 2012/0134226 A1 | 5/2012 | Chow |
| 2012/0140540 A1 | 6/2012 | Agam et al. |
| 2012/0182798 A1 | 7/2012 | Hosono et al. |
| 2012/0195146 A1 | 8/2012 | Jun et al. |
| 2012/0198310 A1 | 8/2012 | Tran et al. |
| 2012/0221788 A1 | 8/2012 | Raghunathan |
| 2012/0246380 A1 | 9/2012 | Akerib et al. |
| 2012/0265964 A1 | 10/2012 | Murata et al. |
| 2012/0281486 A1 | 11/2012 | Rao et al. |
| 2012/0303627 A1 | 11/2012 | Keeton et al. |
| 2013/0003467 A1 | 1/2013 | Klein |
| 2013/0061006 A1 | 3/2013 | Hein |
| 2013/0107623 A1 | 5/2013 | Kavalipurapu et al. |
| 2013/0117541 A1 | 5/2013 | Choquette et al. |
| 2013/0124783 A1 | 5/2013 | Yoon et al. |
| 2013/0132702 A1 | 5/2013 | Patel et al. |
| 2013/0138646 A1 | 5/2013 | Sirer et al. |
| 2013/0163362 A1 | 6/2013 | Kim |
| 2013/0173888 A1 | 7/2013 | Hansen et al. |
| 2013/0205114 A1 | 8/2013 | Badam et al. |
| 2013/0219112 A1 | 8/2013 | Okin et al. |
| 2013/0227361 A1 | 8/2013 | Bowers et al. |
| 2013/0283122 A1 | 10/2013 | Anholt et al. |
| 2013/0286705 A1 | 10/2013 | Grover et al. |
| 2013/0326154 A1 | 12/2013 | Haswell |
| 2013/0332707 A1 | 12/2013 | Gueron et al. |
| 2014/0185395 A1 | 7/2014 | Seo |
| 2014/0215185 A1 | 7/2014 | Danielsen |
| 2014/0250279 A1 | 9/2014 | Manning |
| 2014/0281340 A1 | 9/2014 | Confer et al. |
| 2014/0344934 A1 | 11/2014 | Jorgensen |
| 2015/0029798 A1 | 1/2015 | Manning |
| 2015/0042380 A1 | 2/2015 | Manning |
| 2015/0046644 A1 | 2/2015 | Karp |
| 2015/0063052 A1 | 3/2015 | Manning |
| 2015/0078108 A1 | 3/2015 | Cowles et al. |
| 2015/0120987 A1 | 4/2015 | Wheeler |
| 2015/0134713 A1 | 5/2015 | Wheeler |
| 2015/0270015 A1 | 9/2015 | Murphy et al. |
| 2015/0279466 A1 | 10/2015 | Manning |
| 2015/0324290 A1 | 11/2015 | Leidel |
| 2015/0325272 A1 | 11/2015 | Murphy |
| 2015/0356009 A1 | 12/2015 | Wheeler et al. |
| 2015/0356022 A1 | 12/2015 | Leidel et al. |
| 2015/0357007 A1 | 12/2015 | Manning et al. |
| 2015/0357008 A1 | 12/2015 | Manning et al. |
| 2015/0357019 A1 | 12/2015 | Wheeler et al. |
| 2015/0357020 A1 | 12/2015 | Manning |
| 2015/0357021 A1 | 12/2015 | Hush |
| 2015/0357022 A1 | 12/2015 | Hush |
| 2015/0357023 A1 | 12/2015 | Hush |
| 2015/0357024 A1 | 12/2015 | Hush et al. |
| 2015/0357047 A1 | 12/2015 | Tiwari |
| 2016/0062672 A1 | 3/2016 | Wheeler |
| 2016/0062673 A1 | 3/2016 | Tiwari |
| 2016/0062692 A1 | 3/2016 | Finkbeiner et al. |
| 2016/0062733 A1 | 3/2016 | Tiwari |
| 2016/0063284 A1 | 3/2016 | Tiwari |
| 2016/0064045 A1 | 3/2016 | La Fratta |
| 2016/0064047 A1 | 3/2016 | Tiwari |
| 2016/0098208 A1 | 4/2016 | Willcock |
| 2016/0098209 A1 | 4/2016 | Leidel et al. |
| 2016/0110135 A1 | 4/2016 | Wheeler et al. |
| 2016/0125919 A1 | 5/2016 | Hush |
| 2016/0154596 A1 | 6/2016 | Willcock et al. |
| 2016/0155482 A1 | 6/2016 | La Fratta |
| 2016/0188250 A1 | 6/2016 | Wheeler |
| 2016/0196142 A1 | 7/2016 | Wheeler et al. |
| 2016/0196856 A1 | 7/2016 | Tiwari et al. |
| 2016/0225422 A1 | 8/2016 | Tiwari et al. |
| 2016/0266873 A1 | 9/2016 | Tiwari et al. |
| 2016/0266899 A1 | 9/2016 | Tiwari |
| 2016/0267951 A1 | 9/2016 | Tiwari |
| 2016/0292080 A1 | 10/2016 | Leidel et al. |
| 2016/0306584 A1 | 10/2016 | Zawodny et al. |
| 2016/0306614 A1 | 10/2016 | Leidel et al. |
| 2016/0365129 A1 | 12/2016 | Willcock |

(56) References Cited

U.S. PATENT DOCUMENTS

| | | |
|---|---|---|
| 2016/0371033 A1 | 12/2016 | La Fratta et al. |
| 2017/0052906 A1 | 2/2017 | Lea |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1998 |
| KR | 10-2010-0134235 | 12/2010 |
| KR | 10-2013-0049421 | 5/2013 |
| WO | 2001065359 | 9/2001 |
| WO | 2007131127 | 11/2007 |
| WO | 2010079451 | 7/2010 |
| WO | 2013062596 | 5/2013 |
| WO | 2013081588 | 6/2013 |
| WO | 2013095592 | 6/2013 |

OTHER PUBLICATIONS

Kogge, et al., "Processing in Memory: Chips to Petaflops," May 23, 1997, (8 pgs.), retrieved from: http://www.es.ucf.edu/courses/cda5106/summer02/papers/kogge97PIM.pdf.

Draper, et al., "The Architecture of the DIVA Processing-in-Memory Chip," Jun. 22-26, 2002, (12 pgs.), ICS '02, retrieved from: http://www.isi.edu/~draper/papers/ics02.pdf.

Adibi, et al., "Processing-in-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

International Search Report and Written Opinion for PCT Application No. PCT/US2013/043702, dated Sep. 26, 2013, (11 pgs.).

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

Pagiamtzis, Kostas, "Content-Addressable Memory Introduction", Jun. 25, 2007, (6 pgs.), retrieved from: http://www.pagiamlzis.com/cam/camintro.

Debnath, Biplob, Bloomflash: Bloom Filter on Flash-Based Storage, 2011 31st Annual Conference on Distributed Computing Systems, Jun. 20-24, 2011, 10 pgs.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.

Stojmenovic, "Multiplicative Circulant Networks Topological Properties and Communication Algorithms", (25 pgs.), Discrete Applied Mathematics 77 (1997) 281-305.

Boyd et al., "On the General Applicability of Instruction-Set Randomization", Jul.-Sep. 2010, (14 pgs.), vol. 7, Issue 3, IEEE Transactions on Dependable and Secure Computing.

Elliot, et al., "Computational RAM: Implementing Processors in Memory", Jan.-Mar. 1999, (10 pgs.), vol. 16, Issue 1, IEEE Design and Test of Computers Magazine.

International Search Report and Written Opinion for related PCT Application No. PCT/US2018/029295, dated Jul. 31, 2018, 18 pages.

Extended European Search Report for related EP Application No. 18791111.0, dated Dec. 9, 2020, 9 pages.

\* cited by examiner

TABLE 8-1

| A | B | NOT OPEN | OPEN TRUE | OPEN INVERT |
|---|---|---|---|---|
| 0 | 0 | 0 | 0 | 1 |
| 0 | 1 | 0 | 1 | 0 |
| 1 | 0 | 1 | 0 | 1 |
| 1 | 1 | 1 | 1 | 0 |

871 → A; 873 → B; 875 → NOT OPEN; 877 → OPEN TRUE; 879 → OPEN INVERT; 881 → (swap indicator)

TABLE 8-2

|   | FF | 0 | 0 | 0 | 0 | 0 | 0 | 1 | 1 | 1 | ← 884 |
|---|---|---|---|---|---|---|---|---|---|---|---|
|   | FT | 0 | 0 | 0 | 1 | 1 | 1 | 0 | 0 | 0 | ← 885 |
|   | TF | 0 | 0 | 1 | 0 | 0 | 1 | 0 | 0 | 1 | ← 886 |
|   | TT | 0 | 1 | 0 | 0 | 1 | 0 | 0 | 1 | 0 | ← 887 |
| A | B | A | A*B | A*$\bar{B}$ | A+B | B | AXB | A+$\bar{B}$ | $\overline{AXB}$ | $\bar{B}$ | ← 888 |
| 0 | 0 | 0 | 0 | 0 | 0 | 0 | 0 | 1 | 1 | 1 |   |
| 0 | 1 | 0 | 0 | 0 | 1 | 1 | 1 | 0 | 0 | 0 |   |
| 1 | 0 | 1 | 0 | 1 | 1 | 0 | 1 | 1 | 0 | 1 |   |
| 1 | 1 | 1 | 1 | 0 | 1 | 1 | 0 | 1 | 1 | 0 |   |

883 brackets rows 884–887

*Fig. 8*

MEMORY SHAPES

PRIORITY INFORMATION

This application is a Continuation of U.S. application Ser. No. 15/496,886, filed Apr. 25, 2017, which issues as U.S. Pat. No. 10,942,843 on Mar. 9, 2021, the contents of which are included herein by reference.

TECHNICAL FIELD

The present disclosure relates generally to semiconductor memory and methods, and more particularly, to multidimensional, contiguous, physical allocation of a memory device via use of memory shapes.

BACKGROUND

Memory devices are typically provided as internal, semiconductor, integrated circuits in computing systems or other electronic devices. There are many different types of memory including volatile and non-volatile memory. Volatile memory can require power to maintain its data (e.g., user data, error data, etc.) and includes random-access memory (RAM), dynamic random access memory (DRAM), and synchronous dynamic random access memory (SDRAM), among others. Non-volatile memory can provide persistent data by retaining stored data when not powered and can include non-volatile random access memory (NVRAM), NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), such as spin torque transfer random access memory (STT RAM), among others.

Computing systems often include a number of processing resources (e.g., one or more processors), which may retrieve and execute instructions and store the results of the executed instructions to a suitable location. A processing resource can comprise a number of functional units (e.g., herein referred to as functional unit circuitry (FUC)) such as arithmetic logic unit (ALU) circuitry, floating point unit (FPU) circuitry, and/or a combinatorial logic block, for example, which can execute instructions to perform logical operations such as AND, OR, NOT, NAND, NOR, and XOR logical operations on data (e.g., one or more operands).

A number of components in a computing system may be involved in providing instructions to the functional unit circuitry for execution. The instructions may be generated, for instance, by a processing resource such as a controller and/or host processing resource. Data (e.g., the operands on which the instructions will be executed to perform the logical operations) may be stored in a memory array that is accessible by the FUC. The instructions and/or data may be retrieved from the memory array and sequenced and/or buffered before the FUC begins to execute instructions on the data. Furthermore, as different types of operations may be executed in one or multiple clock cycles through the FUC, intermediate results of the operations and/or data may also be sequenced and/or buffered. In many instances, the processing resources (e.g., processor and/or associated FUC) may be external to the memory array, and data can be accessed (e.g., via a bus between the processing resources and the memory array to execute instructions). Data can be moved from the memory array to registers external to the memory array via a bus.

BRIEF DESCRIPTION OF THE DRAWINGS

FIG. 8 is a logic table illustrating selectable logic operation results implemented by sensing circuitry in accordance with a number of embodiments of the present disclosure.

DETAILED DESCRIPTION

Figure 1:
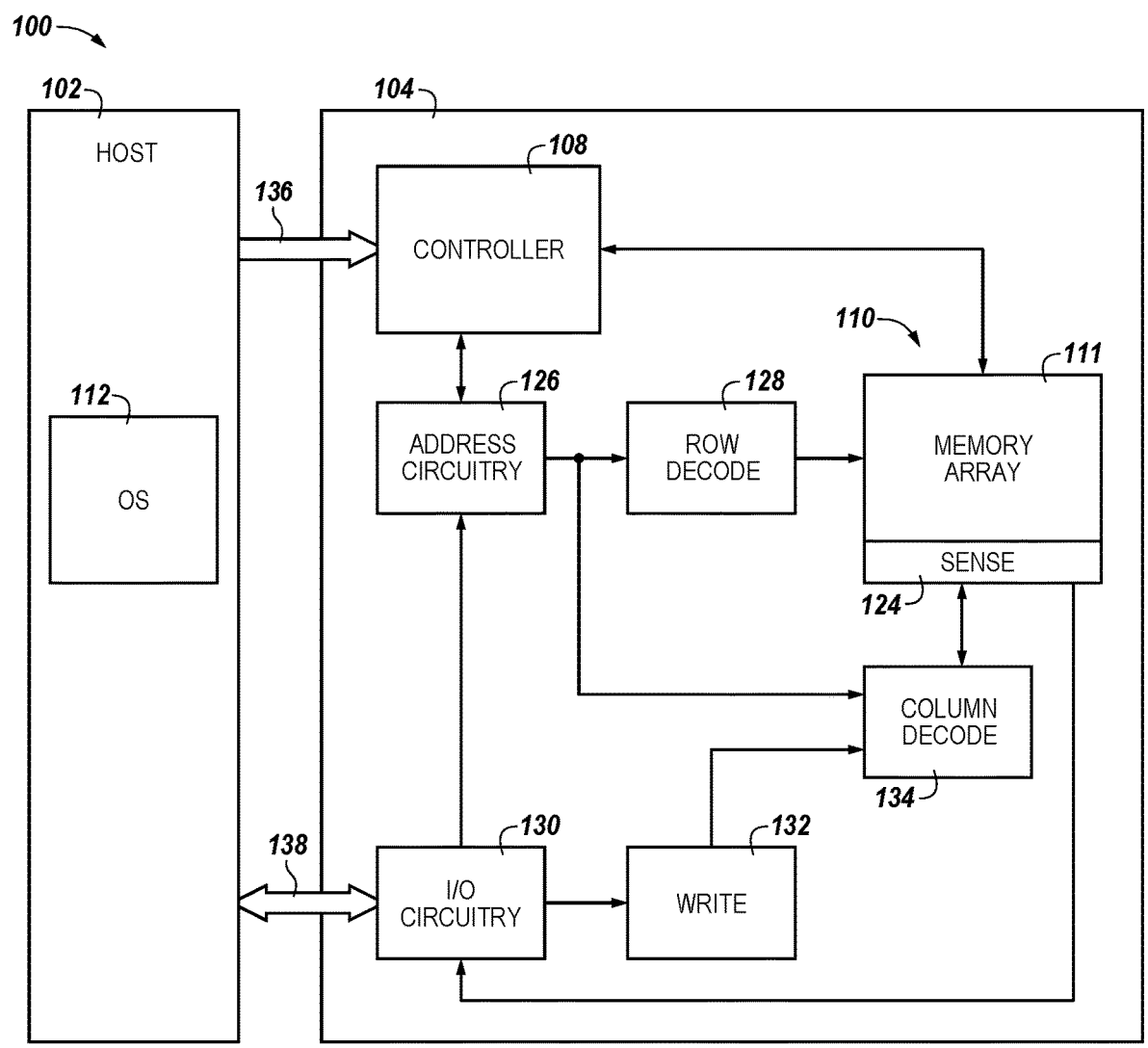
FIG. 1 illustrates a block diagram of an apparatus in the form of a computing system including at least one memory system in accordance with a number of embodiments of the present disclosure.

In some approaches to allocating memory, operating systems (OSs) may provide a method for organizing allocated memory blocks in physical space. With respect to this discussion, an "allocated memory block" refers to the location in physical memory where amount of allocated memory (e.g., a quantity of bytes) is stored. For example, the calloc( ) function allocates a specified number of bytes and initializes them to zero, which assures that all bytes of the allocated memory block have been initialized to zero. The calloc( ) function can identify a size in bytes of a single variable and a number of the variables to be allocated in memory. However, the organization of memory blocks may be one-dimensional (e.g., entirely linear). That is, memory blocks can be organized such that data is stored to a plurality of memory cells coupled to contiguous sense lines but a single access line. A one-dimensional physical memory allocation may support the bandwidth of a host processor across a diverse set of applications running on the host. To that end, a one-dimensional physical memory allocation may increase memory bandwidth from a host processor. The allocated memory blocks may be distributed linearly across multiple memory banks or memory devices (e.g., interleaved across multiple memory banks or memory devices).

Thus, users may be limited to allocating memory blocks according to the one-dimensional physical memory allocation. As used herein, "users" refer to programmers as opposed to an end-user.

Recent advances in memory technology, for example, processing in memory, can benefit from multidimensional allocation of memory. That is, a multidimensional allocation of memory can include a plurality of memory cells coupled to contiguous sense lines and contiguous access lines of a single memory array. Thus it may be advantageous to allocate physically contiguous portions of memory array in multiple dimensions. However, the notions of multidimensional allocation of memory do not fit current models of one-dimensional memory allocation. If memory is allocated physically in one dimension then the performance of a PIM device may be degraded because of inherent inability to co-locate data elements in the same physical memory component. Overall system performance may also be degraded if a virtual memory allocation does not take into account multidimensional memory arrangement. For a PIM device to operate on data stored in a memory allocation, the data must be physically organized in the same physical memory component (e.g., memory bank, memory device, etc.) or be moved to that physical organization before/during the operation. This can be because of the coupling of the sensing circuitry to the memory array such that data is operated on a column-by-column basis. Thus, the physical layout and orientation of individually allocated memory blocks may affect the performance of the PIM device.

To overcome limitations on physical organization of data of one-dimensional memory allocation, the present disclosure is related to storing data in a multidimensional, contiguous, physical allocation of a memory array. A user-defined multidimensional, contiguous, physical allocation of memory is herein referred to as a memory shape. A definition of the memory shape by a user can include a quantity of contiguous columns of the memory array, a quantity of contiguous rows of the memory array, and a major dimension of the memory shape. The major dimension, either a horizontal major dimension or a vertical major dimension, can determine the first dimension by which to stride the data stored in the memory shape. Examples of major dimensions are discussed further below in association with FIGS. 2 and 3. A user (e.g., programmer) can define a memory shape such that the definition of a memory shape is a user definition of a memory shape.

Memory can be allocated to contiguous, physical portions of a memory array. Such an allocation is hereinafter referred to as a memory shape. Memory shapes can enable a user (e.g., a programmer) to explicitly define the dimensional structure and layout of a target memory allocation. Memory shapes can be advantageous when the memory is allocated for use by a processing in memory (PIM) device. Co-locating data items in a same physical memory component (e.g., memory bank, memory device, etc.) via memory shapes can improve the performance of the PIM device and the overall performance of a system comprising the PIM device. Thus, memory shapes can promote a performance-optimized memory organization for PIM devices.

A number of embodiments of the present disclosure can promote improved data locality between data elements and within the data elements by storing data elements in a memory shape. As used herein, "data element" refers to a group of bits that represents a data value such as an integer, a floating point, or a string. As used herein, "storing a data element in a memory shape" refers to storing the data element in one or more memory cells coupled to access lines and sense lines of the memory shape. The definition of a memory shape exceeds that of the one-dimensional physical organization, which only includes the size of the memory allocation and the size of the individual data elements of the memory allocation. A number of embodiments can include storing more than one type of data element (e.g., integers, floating points, strings, etc.) in a single memory shape. A multidimensional, contiguous, physical portion of a memory array can be allocated according to more than one memory shape. Storing data elements in one or more memory shapes can reduce the communication between multiple memory banks or memory devices. As a result, the bandwidth of a host processor can be increased because the data elements are stored such that the host processor does not need to communicate with multiple memory banks or memory devices. A number of embodiments can include performing an operation on data stored in a memory shape.

A memory shape can include a number of memory cells to store at least one entire data element in the memory shape. For example, if a length of a data element is four bytes of physical memory, then the memory shape can include a number of memory cells necessary to store the four bytes of the data element. However, the memory shape can include a number of memory cells that exceeds that necessary to store the four bytes of the data element. The major dimension of a memory shape can be aligned with the length of a data element. For example, if a memory shape includes 1024 data elements that are one byte in length, the number of columns of the memory shape for a horizontal major dimension or the number of rows of the memory shape for a vertical major dimension can be multiples of one byte. An operation can be performed on one or more data element of a memory shape (e.g., performing the operation within the memory shape). An operation can be performed data elements of multiple memory shapes (e.g., performing the operation between the multiple memory shapes).

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "A", "B", "C", "M", "N", "S", and "X", particularly with respect to reference numerals in the drawings, indicates that a number of the particular feature so designated can be included. As used herein, "a number of" a particular thing can refer to one or more of such things (e.g., a number of memory devices can refer to one or more memory devices). As used herein, the terms "first" and "second" are used to differentiate between one feature from another and do not necessarily imply an order between the features so designated.

The figures herein follow a numbering convention in which the first digit or digits correspond to the drawing figure number and the remaining digits identify an element or component in the drawing. Similar elements or components between different figures may be identified by the use of similar digits. For example, 240 may reference element "40" in FIG. 2, and a similar element may be referenced as 340 in FIG. 3. Multiple analogous elements within one figure may be referenced with a reference numeral followed by a hyphen and another numeral or a letter. For example, 240-1 may reference element 40-1 in FIGS. 2 and 240-X may reference element 40-X, which can be analogous to element 440-1. Such analogous elements may be generally referenced without the hyphen and extra numeral or letter. For example, elements 240-1, . . . , 240-X may be generally referenced as 240. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates a block diagram of an apparatus in the form of a computing system 100 including at least one memory system 104 in accordance with a number of embodiments of the present disclosure. As used herein, a host 102, a memory system 104, a memory device 110, a memory array 111, and/or sensing circuitry 124 might also be separately considered an "apparatus."

The computing system 100 can include a host 102 coupled to memory system 104, which includes a memory device 110 (e.g., including a memory array 111 and/or sensing circuitry 124). The host 102 can be a host system such as a personal laptop computer, a desktop computer, a digital camera, a mobile telephone, or a memory card reader, among various other types of hosts. In some embodiments, the host 102 can be or include a memory management unit. A memory management unit is a hardware component that performs translation between virtual memory addresses and physical memory addresses. The host 102 can include a system motherboard and/or backplane and can include a number of processing resources (e.g., one or more processors, microprocessors, or some other type of controlling circuitry). The computing system 100 can include separate integrated circuits or both the host 102 and the memory system 104 can be on the same integrated circuit. The computing system 100 can be, for instance, a server system and/or a high performance computing system and/or a portion thereof. Although the example shown in FIG. 1 illustrates a system having a Von Neumann architecture, embodiments of the present disclosure can be implemented in non-Von Neumann architectures (e.g., a Turing machine), which may not include one or more components (e.g., CPU, ALU, etc.) often associated with a Von Neumann architecture.

For clarity, the computing system 100 has been simplified to focus on features with particular relevance to the present disclosure. The memory array 111 can be a hybrid memory cube (HMC), processing in memory random access memory (PIMRAM) array, DRAM array, SRAM array, STT RAM array, PCRAM array, TRAM array, RRAM array, NVRAM array, NAND flash array, and/or NOR flash array, for instance. The memory array 111 can comprise memory cells arranged in rows coupled by access lines (which may be referred to herein as word lines or select lines) and columns coupled by sense lines (which may be referred to herein as digit lines or data lines). Although a single memory device 110 is shown in FIG. 1, embodiments are not so limited. For instance, memory system 104 may include a number of memory devices 110 (e.g., a number of banks of DRAM cells).

The memory device 110 can be a multidimensional random access memory. A dimension of memory is a coordinate that can be used to specify a location within the memory (e.g., the location of a memory cell or allocable portion of memory). Examples of dimensions of a memory include rows, columns, layers (e.g., in the case of a hybrid memory cube), banks, chips, etc. A memory can have more than three dimensions in terms of coordinates. For example, a memory device 110 can include multiple memory channels (a first dimension of the memory device is a channel), each channel including multiple memory dies (a second dimension of the memory device 110 is a die), each die including multiple subarrays (a third dimension of the memory device 110 is a subarray), and each subarray including multiple rows (a fourth dimension of the memory is a row). Some embodiments are described herein with respect to a two-dimensional memory device for ease of illustration and explanation however embodiments are not so limited. One of ordinary skill in the art, having read and understood the present disclosure can apply the teachings to a memory device 110 having more than two dimensions.

The memory system 104 can include address circuitry 126 to latch address signals provided over an I/O bus 138 (e.g., a data bus) through I/O circuitry 130. Address signals can be received and decoded by a row decoder 128 and a column decoder 134 to access the memory device 110. Data can be read from the memory array 111 by sensing voltage and/or current changes on the sense lines using sensing circuitry 124. The sensing circuitry 124 can read and latch a page (e.g., row) of data from the memory array 111. The I/O circuitry 130 can be used for bi-directional data communication with host 102 over the I/O bus 138. The write circuitry 132 can be used to write data to the memory device 110.

Controller 108 can decode signals provided by control bus 136 from the host 102. These signals can include chip enable signals, write enable signals, and address latch signals that are used to control operations performed on the memory device 110, including data read, data write, and data erase operations. In various embodiments, the controller 108 is responsible for executing instructions from the host 102. The controller 108 can be a state machine, a sequencer, a processor, and/or other control circuitry.

The host 102 can be configured with an operating system "OS" 112. The host 102 can be coupled to the memory device 110 (e.g., via the control bus 136 and/or the I/O bus 138. The OS 112 is executable instructions (software) that manages hardware resources and provides services other executable instructions (programs) that run on the OS 112. The OS 112 can include instructions to respond to a received user definition of a memory shape. The user definition of the memory shape can be an allocation of a multidimensional, contiguous, physical portion of a memory array, as described herein. The user definition of the memory shape can originate from the host 102 (e.g., from a program running on the host 102) among other originations (e.g., from a direct memory access (DMA) device).

The host 102 can be configured to receive the user definition of a memory shape, receive the user definition of a quantity of the memory shapes, allocate contiguous columns and contiguous rows of memory cells of a single physical memory component of the memory device according to the user definitions, and store a plurality of data elements contiguously in the single physical memory component of the memory device 110 according to the user definitions. The host 102 can be configured to allocate the contiguous columns and contiguous rows of memory cells of the single physical memory component such that each of the memory shapes comprises memory cells coupled to common access lines. The host 102 can be configured to address (e.g., a vector-style address) each memory shape individually such that the operation is performed on data elements stored in particular memory shape. Although not illustrated in FIG. 1, the host can include a memory allocation application program interface (API) configured to receive the user definitions.

An example of the sensing circuitry 124 is described further below in association with FIG. 2. For instance, in a number of embodiments, the sensing circuitry 124 can comprise a number of sense amplifiers and a number of compute components, which may comprise latch serving as an accumulator and can be used to perform operations (e.g., on data associated with complementary sense lines) such as logical operations. Logical operations can include Boolean operations (e.g., AND, OR, NOR, XOR, etc.) as well as combinations of Boolean operations to perform other mathematical operations. In a number of embodiments, the sensing circuitry 124 can be used to perform logical operations using data stored in the memory array 111 as inputs and store the results of the logical operations back to the memory array 111 without transferring via a sense line address access (e.g., without firing a column decode signal). As such, a logical operation can be performed using sensing circuitry 124 rather than and/or in addition to being performed by processing resources external to the sensing circuitry 124 (e.g., by a processor associated with host 102 and/or other processing circuitry, such as ALU circuitry, located on the memory system 104, such as on the controller 108, or elsewhere).

In various previous approaches, data associated with a logical operation, for instance, would be read from memory via sensing circuitry and provided to an external ALU. The external ALU circuitry would perform the logical operations using the elements (which may be referred to as operands or inputs) and the result could be transferred back to the array via the local I/O lines. In contrast, in a number of embodiments of the present disclosure, sensing circuitry 124 can be configured to perform a logical operation on data stored in memory cells in memory array 111 and store the result back to the array 111 without enabling a local I/O line coupled to the sensing circuitry.

The sensing circuitry 124 can be configured to perform an operation on at least one of the plurality of data elements stored in a memory shape. The sensing circuitry 124 can be configured to perform an operation on a first data element of a first memory shape and perform an operation on a second data element of a second memory shape. The sensing circuitry 124 can be configured to perform the operation on a first data element and a second data element of a particular memory shape. The sensing circuitry 124 can be configured to perform the operation on the plurality of data elements concurrently.

As such, in a number of embodiments, registers and/or an ALU external to the memory array 111 and sensing circuitry 124 may not be needed to perform the logical operation as the sensing circuitry 124 can be operated to perform the logical operation using the address space of memory array 111. Additionally, the logical operation can be performed without the use of an external processing resource.

Figure 2:
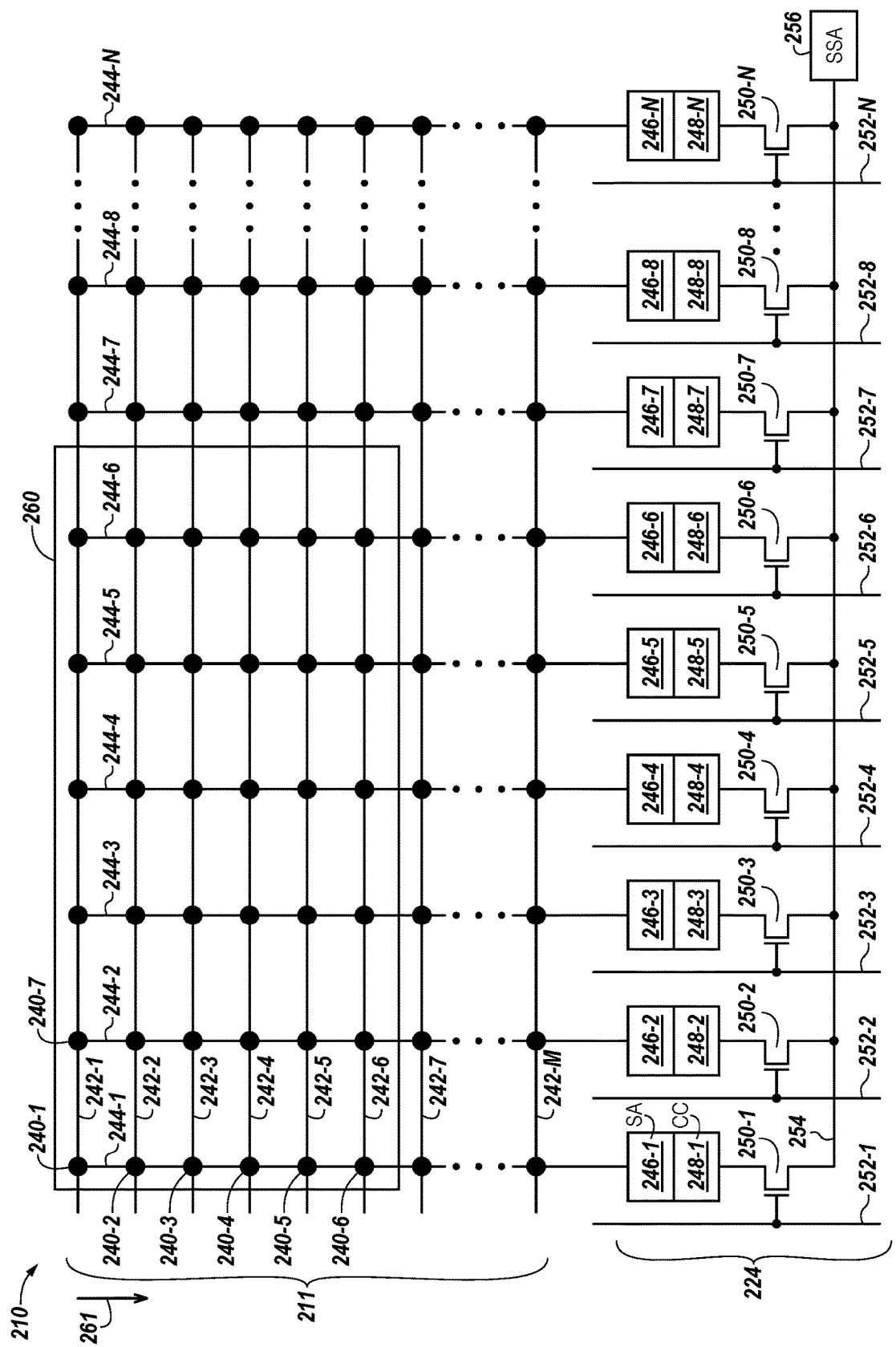
FIG. 2 illustrates a schematic diagram of a portion of a memory device illustrating a multidimensional, contiguous, physical allocation according to a memory shape in accordance with a number of embodiments of the present disclosure.

FIG. 2 illustrates a schematic diagram of a portion of a memory device 210 illustrating a multidimensional, contiguous, physical allocation according to a memory shape 260 in accordance with a number of embodiments of the present disclosure. The memory device 210 can include a memory array 211 that includes the memory cells 240 (represented by the filled-in circles) coupled to the rows of access lines 242-1, 242-2, 242-3, 242-4, 242-5, 242-6, 242-7, . . . , 242-M and the columns of sense lines 244-1, 244-2, 244-3, 244-4, 244-5, 244-6, 244-7, 244-8, . . . , 244-N. The memory array 211 is not limited to a particular number of access lines and/or sense lines, and use of the terms "rows" and "columns" does not intend a particular physical structure and/or orientation of the access lines and/or sense lines. Although not pictured, each column of memory cells can be associated with a corresponding pair of complementary sense lines. An example where each column of memory cells is associated with a corresponding pair of complementary sense lines is discussed further below in association with FIG. 7.

The memory shape 260 is denoted by a box encompassing a group of the memory cells 240 coupled to the access lines 242-1 to 242-6 and the sense lines 244-1 to 244-6. That is, the memory shape 260 is a 6×6 memory shape comprising six adjacent rows of the memory cells 240 and six adjacent columns of the memory cells 240. As used herein, "a row of memory cells" may refer to a subset of the memory cells coupled to an access line and "a column of memory cells" may refer to a subset of the memory cells coupled to a sense line. The major dimension of the memory shape 260 is a vertical major dimension as indicated by the arrow 261. Because the major dimension is a vertical major dimension, the stride within the memory shape 260 can begin with transferring data to or from the memory cell 240-1, then transferring data to or from the memory cell 240-2, and so on such that data is transferred to or from the memory cells 240-1 to 240-6 coupled to the sense line 244-1 before data is transferred to or from the memory cells coupled to the sense line 244-2 beginning with the memory cell 240-7.

An example of pseudo code for defining a memory shape as a programming language data structure (e.g., a C struct) can be summarized as follows:

```
//- shape structure
struct_mcs_shape_t{
    unsigned _rows;      //- quantity of contiguous rows
    unsigned _cols;      //- quantity of contiguous coluimns
    unsigned _major;     //- 0x00 indicates a vertical major dimension
                         //- 0x01 indicates a horizontal major
    dimension
}
```

An example of pseudo code of a program function (e.g., a macro) for users (e.g., programmers) to allocate a multidimensional, contiguous, physical portion of a memory array according to a memory shape, as defined above, as follows:

```
//- shape macro
#define MAJOR_VERTICAL              0x00
#define MAJOR_HORIZONTAL            0x01
#define _shape( NAME, R, C, M)                      \
    { struct _mcs_shape_t NAME = {._rows = R, \
    ._cols = C, ._major = M}; }
```

For example, a user can allocate a multidimensional, contiguous, physical portion of the memory array 211 according to the memory shape 260 via the program function "shape" described above:

_shape (MY_SHAPE, 6, 6, MAJOR_VERTICAL)

A data element can be stored in the memory cells corresponding to each of the contiguous columns of the memory shape 260. For example, a data element can be stored in the memory cells 240-1 to 240-6, which correspond to the first column of the memory shape 260. The data element can be one of several types of data elements including but not limited to an integer, a floating point, or a string. Another data element, of the same type as or a different type than the data element stored in the first column, can be stored in a group of the memory cells 240 coupled to the sense line 244-2 and the access lines 242-1 to 242-6 corresponding to the second column of the memory shape 260.

Another data element of the same length as or a different length than the data element stored in the first column of the memory shape 260 can be stored in the second column of the memory shape 260. For example, a first data element can be stored in six of the memory cells 240 coupled to the access lines 242-1 to 242-6 and the sense line 244-1 of the first column of the memory shape 260. A second data element can be stored in four of the memory cells 240 coupled to the access lines 242-1 to 242-4 and the sense line 244-2 of the second column of the memory shape 260.

In at least one embodiment padding can be stored in memory cells of a memory shape when a data element of a length less than the length of the major dimension of the memory shape is stored in the memory shape. As used herein, "padding" refers to bits stored in memory cells of a memory shape that are not storing bits of a data element. For example, if a data element is stored in the memory cells 240-1 to 240-4 of the memory shape 260, then padding can be stored in the memory cells 240-5 and 240-6 of the memory shape 260. The length of the padding (e.g., the quantity of bits) can be equal to the difference of the length of the first data element and the length of the second data element.

Each column of memory cells can be coupled to sensing circuitry 224, which can be analogous to sensing circuitry 124 illustrated in FIG. 1. In this example, the sensing circuitry includes a number of sense amplifiers 246-1, 246-2, 246-3, 246-4, 246-5, 246-6, 246-7, 246-8, . . . , 246-N coupled to the respective sense lines 244. The sense amplifiers 246 are coupled to input/output (I/O) line 254 (e.g., a local I/O line) via access devices (e.g., transistors) 250-1, 250-2, 250-3, 250-4, 250-5, 250-6, 250-7, 250-8, . . . , 250-N. In this example, the sensing circuitry 224 also includes a number of compute components 248-1, 248-2, 248-3, 248-4, 248-5, 248-6, 248-7, 248-8, . . . , 248-N coupled to the respective sense lines 244. Column decode lines 252-1, 252-2, 252-3, 252-4, 252-5, 252-6, 252-7, 252-8, . . . , 252-N are coupled to the gates of transistors 250 respectively, and can be selectively activated to transfer data sensed by respective sense amps 246 and/or stored in respective compute components 248 to a secondary sense amplifier 256. In a number of embodiments, the compute components 248 can be formed on pitch with the memory cells of their corresponding columns and/or with the corresponding sense amplifiers 246.

In a number of embodiments, the sensing circuitry (e.g., compute components 248 and sense amplifiers 246) is configured to perform a number of operations (e.g., logical operations) on data stored in the memory array 211. As an example, a first data element can be stored in a first group of memory cells coupled to a particular access line (e.g., access line 242-1) and to a number of sense lines 244, and a second data element can be stored in a second group of memory cells coupled to a different access line (e.g., access line 242-2) and the respective number of sense lines 244. Each memory cell 240 can store a bit of the first data element or the second data element. For example, each bit of the first data element can have a logical operation performed thereon with a respective bit of the second data element. The result of the logical operation can be stored (e.g., as a bit-vector) in a third group of memory cells coupled to a particular access line (e.g., access line 242-3) and to the number of sense lines 244.

A number of embodiments can include a memory array 211 including many (e.g., thousands) of the sense lines 244. According to the present disclosure, a logical operation can be performed on the many memory elements associated with the many (e.g., thousands) of the sense lines 244 in parallel in memory (e.g., without transferring the data out of the array, such as to a processing resource). Such embodiments can save a significant amount of time that would otherwise be required if the data was transferred to a processing resource to perform the logical operations (e.g., at 64 bits per clock cycle). Further advantages can be realized by allocating a multidimensional, contiguous, physical portion of a memory array before the logical operation is performed so that there is no stall in the performance of the logical operation in memory in order to align data and/or allocate a temporary allocable portion of memory (e.g., allocate a temporary row of memory).

Figure 3:
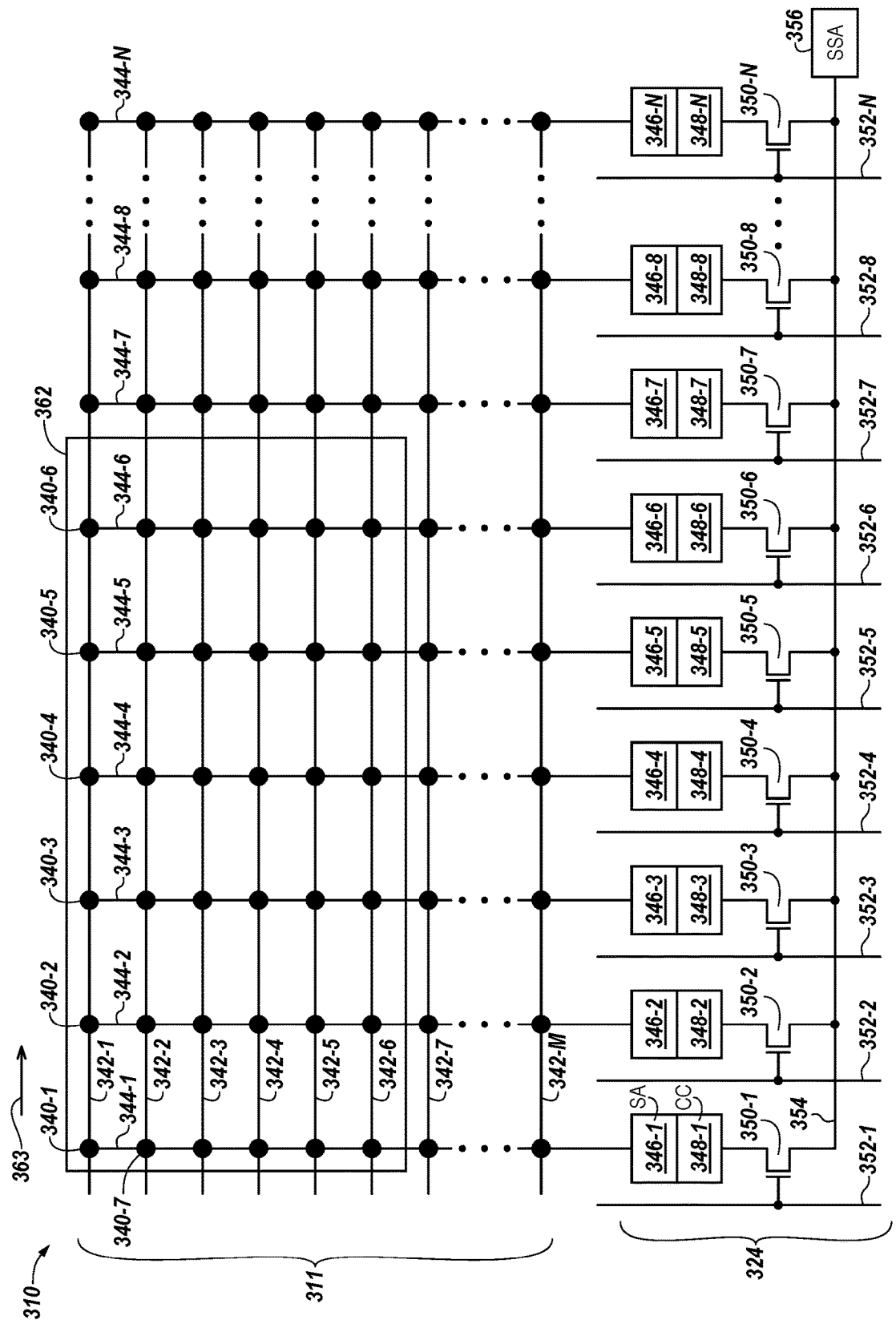
FIG. 3 illustrates a schematic diagram of a portion of a memory device illustrating a multidimensional, contiguous, physical allocation according to a memory shape in accordance with a number of embodiments of the present disclosure.

FIG. 3 illustrates a schematic diagram of a portion of a memory device 310 illustrating a multidimensional, contiguous, physical allocation according to a memory shape 362 in accordance with a number of embodiments of the present disclosure. The portion of the memory device 310 can be analogous to the portion of the memory device 210 illustrated in FIG. 2. The memory shape 362 is denoted by a box encompassing a group of the memory cells 340 (represented by the filled-in circles) coupled to the access lines 342-1 to 342-6 and the sense lines 344-1 to 344-6. That is, the memory shape 362 is a 6×6 memory shape comprising six contiguous rows of the memory cells 340 and six contiguous columns of the memory cells 340. The major dimension of the memory shape 362 is a horizontal major dimension as indicated by the arrow 363. Because the major dimension is a horizontal major dimension, the stride within the memory shape can begin with transferring data to or from the memory cell 340-1, then transferring data to or from the memory cell 340-2, and so on such that data is transferred to or from the memory cells 340-1 to 340-6 coupled to the access line 342-1 before data is transferred to or from the memory cells coupled to the access line 342-2 beginning with the memory cell 340-7.

For example, a user can allocate a multidimensional, contiguous, physical portion of the memory array 311 according to the memory shape 362 via the program function "shape" described above:

_shape (MY_SHAPE, 6, 6, MAJOR_HORIZONTAL)

A data element can be stored in the memory cells corresponding to each of the contiguous rows of the memory shape 362. For example, a data element can be stored in the memory cells 340-1 to 340-6, which correspond to the first row of the memory shape 362. The data element can be one of several types of data elements including but not limited to an integer, a floating point, or a string. Another data element, of the same type as or a different type than the data element stored in the first column, can be stored in a group of the memory cells 340 coupled to the access line 342-2 and the sense lines 344-1 to 344-6 corresponding to the second column of the memory shape 362.

Figure 4:
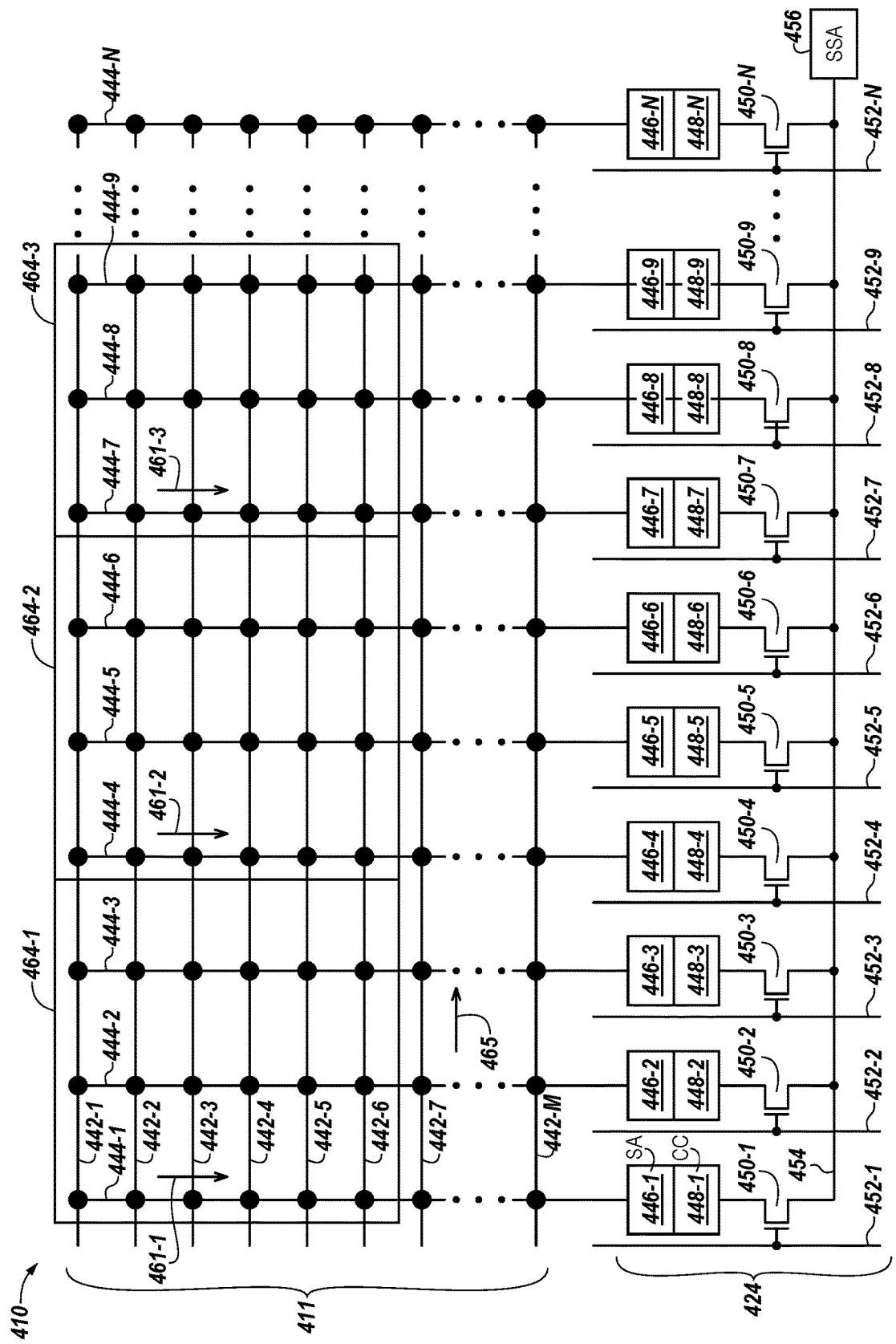
FIG. 4 illustrates a schematic diagram of a portion of a memory device illustrating a multidimensional, contiguous, physical allocation according to a plurality of memory shapes in accordance with a number of embodiments of the present disclosure.

FIG. 4 illustrates a schematic diagram of a portion of a memory device illustrating a multidimensional, contiguous, physical allocation according to a plurality of memory shapes 464-1 to 464-3 in accordance with a number of embodiments of the present disclosure. The portion of the memory device 410 can be analogous to the portion of the memory device 210 illustrated in FIG. 2. The plurality of memory shapes 464-1 to 464-3 are contiguous as denoted by the boxes encompassing groups of the memory cells (represented by the filled-in circles) coupled to the access lines 442-1 to 442-6 and the sense lines 444-1 to 444-9. That is, each of the plurality of memory shapes 464-1 to 464-3 is a 6×3 memory shape comprising six contiguous rows of the memory cells and three contiguous columns of the memory cells such that the memory shape 464-1 includes the memory cells coupled to the access lines 442-1 to 442-6 and the sense lines 444-1 to 444-3, the memory shape 464-2 includes the memory cells coupled to the access lines 442-1 to 442-6 and the sense lines 444-4 to 444-6, and the memory shape 464-3 includes the memory cells coupled to the access lines 442-1 to 442-6 and the sense lines 444-7 to 444-9. The major dimension of each of the plurality of memory shapes 464-1 to 464-3 is a vertical major dimension as indicated by the arrows 461-1 to 461-3.

The memory shape to memory shape stride from one memory shape (e.g., the memory shape 464-1) to another memory shape (e.g., the memory shape 464-2) can be horizontal as indicated by the arrow 465. Although the plurality of memory shapes can have a vertical memory shape to memory shape stride such that the plurality of memory shapes are vertically adjacent, a horizontal memory shape to memory shape stride such that the plurality of memory shapes are horizontally adjacent can overcome the physical constraints of a memory array. One such physical constraint can be that the quantity of access lines (e.g., the quantity of rows of memory cells) is less than the quantity of sense lines (e.g., the quantity of columns of memory cells). For example, a memory array may have 512 or 1024 access lines but have thousands of the sense lines 444. In previous approaches, data elements may be wrapped such that a data element begins in one column, or row, and ends in a different column, or row. Some columns may be masked because data elements may not be stored in adjacent columns in contrast to at least one embodiment in accordance with the present disclosure. That is, masking may not be necessary to exclude undesired data from being operated on because the data elements are stored in adjacent columns or rows.

A plurality of memory shapes with a vertical major dimension can improve the overall performance of a system, such as the system 100 illustrated in FIG. 1. By storing a data element in each column of a memory shape, the sensing circuitry, such as the sensing circuitry 424, can be used efficiently such that communication between the physical memory components (e.g., memory device, memory bank, etc.) of a memory device is decreased. Additionally, throughput of a single physical memory component can be increased because a greater portion of the available sensing circuitry is utilized. That is, storing a data element in each column of a memory shape spreads the data elements amongst the sense amplifiers and compute components.

In at least one embodiment, string-type data elements, such as character strings, can be stored in a memory shape. Each of the character strings can comprise characters. A character can be a predefined programming language data structure comprising a byte of data (eight bits of data). For example, a character string can comprise two characters or sixteen bits of data. A multidimensional, contiguous, physical portion of a memory array can be allocated according to a memory shape such that the memory shape includes four of the character strings. If the memory shape has a vertical major dimension, then each of the four character strings can be stored in a column of the memory shape. Thus, four contiguous columns and sixteen contiguous rows of a memory array can be assigned to a 16×4 memory shape. The allocation can enable an operation to be performed on the four data elements of each memory shape concurrently in a single instruction, multiple data (SIMD) fashion. If the allocation includes more than one of the memory shapes, then the operation can be performed on the four data elements of all of the memory shapes concurrently. The following pseudo code can be used to define the four data elements, each comprising two characters:

```
struct data{
    char sentence[4][2];    //-- four character strings, each comprising
                            //-- two characters
};
```

The pseudo code program function "shape" described above in association with FIG. 2 can be used to allocate a multidimensional, contiguous, physical portion of a memory array according to a 16×4 memory shape as follows:
_shape(MY_SHAPE, 16, 4, MAJOR_VERTICAL);

A multidimensional, contiguous, physical portion of a memory array can be allocated according to a plurality of memory shapes, such as the plurality of memory shapes 464-1 to 464-3 illustrated in FIG. 4. Different methods can be utilized to allocate the multidimensional, contiguous, physical portion of a memory array according to the plurality of memory shapes. A first method can include mapping existing data to the plurality of memory shapes. The existing data can be mapped from a different physical memory component of a single memory device, a disk external to the memory device, or the same memory array that will store the mapped data elements. The first method can utilize a memory allocation API to allocate a plurality of memory shapes. An example of pseudo code for allocating a multidimensional, contiguous, physical portion of a memory array according to a plurality of memory shapes can be summarized as follows:
    void*mcs_shape_mmap(size_t  nmemb,  mcs_shape_t shape);
where "nmemb" is the quantity of a previously defined memory shape. For example, three of the memory shape "MY_SHAPE" as defined above can be assigned to a pointer of a particular type using the pseudo code as follows:
    struct  data*mydataptr=mcs_shape_mmap(3,  MY_SHAPE);

A second method can include allocating contiguous rows and contiguous columns of a physical memory component of a memory array in which data will be stored. The second method can be referred to as user-space accommodations. In contrast to the first method where existing data is mapped to the plurality of memory shapes, the second method allocates the memory shapes for future use. The second method can include allocating three of the memory shape "MY_SHAPE" as defined above using the pseudo code as follows:
    struct data*mydata=NULL;
    mydata=mcs_calloc_shape(3,  sizeof(struct  data), MY_SHAPE);

At least one embodiment in accordance with the present disclosure can be used in conjunction with a database, such as that used for medical records, because memory shapes can provide the ability to perform an operation on a particular data element of a memory shape, which can correspond to a particular field of the database. For example, a data element corresponding to each field of a medical records database can be stored in each column of a memory shape. Each of a plurality of memory shapes can correspond to a patient's records. For example, a first string-type data element corresponding to a patient's last name can be stored in the respective first column of the memory shape. A second string-type data element corresponding to the patient's first name can be stored in the respective second column of the memory shape. A first integer-type data element corresponding to the patient's zip code can be stored in the respective third column of the memory shape. A second integer-type data element corresponding to the patient's phone number can be stored in the respective fourth column of the memory shape. If, for example, the medical records for only those patients living in a particular zip code are needed, then an operation can be performed on the data elements stored in the respective third columns of the plurality of memory shapes.

Figure 5:
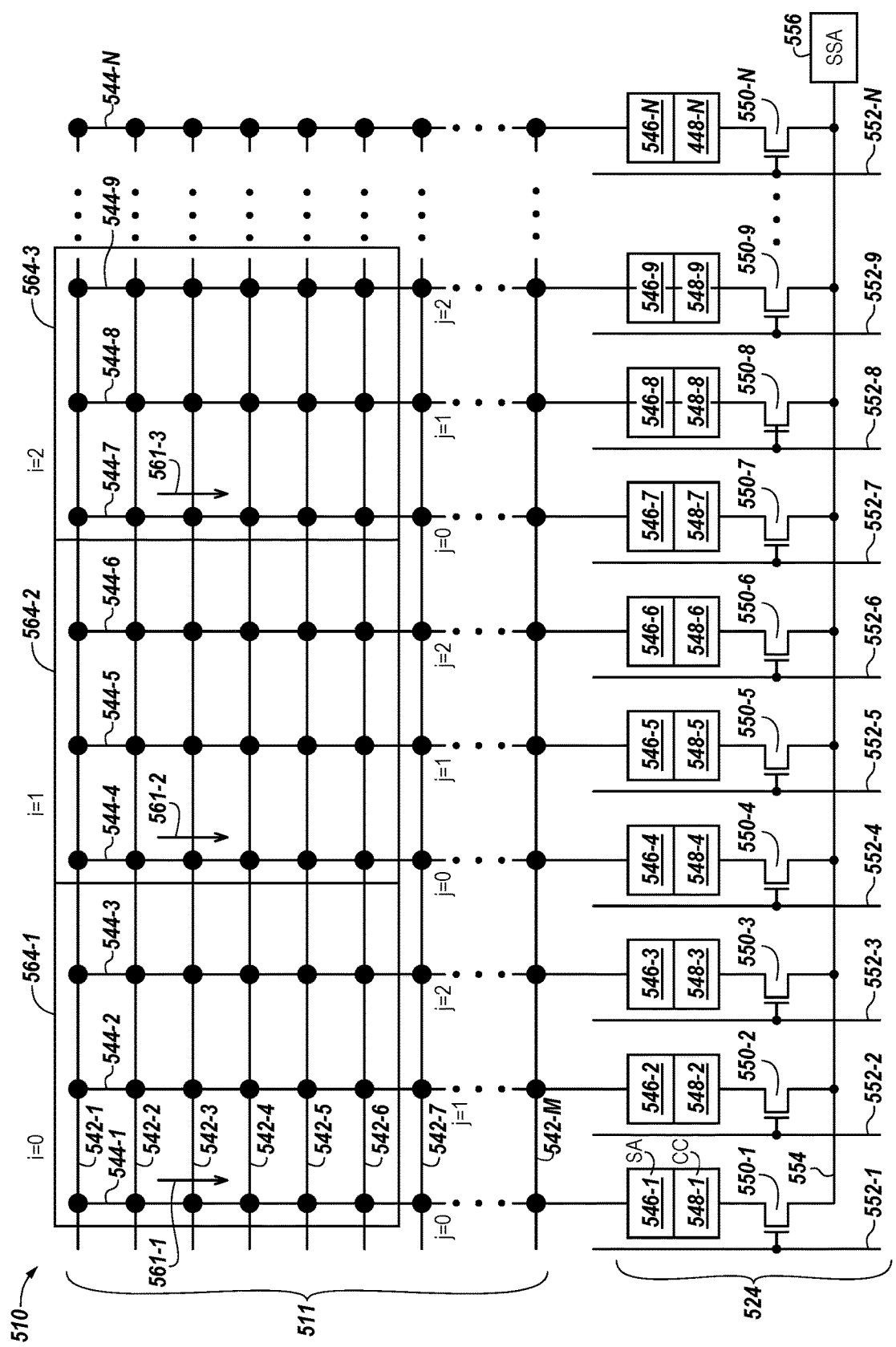
FIG. 5 illustrates a schematic diagram of a portion of a memory device illustrating a multidimensional, contiguous, physical allocation according to a plurality of memory shapes for an outer loop optimization in accordance with a number of embodiments of the present disclosure.

FIG. 5 illustrates a schematic diagram of a portion of a memory device illustrating a multidimensional, contiguous, physical allocation according to a plurality of memory shapes for an outer loop optimization in accordance with a number of embodiments of the present disclosure. The outer loop optimization can include performing an operation on the data elements of the plurality of memory shapes according to a user-defined sequence. The user-defined sequence can indicate which data elements on which to perform the operation. The user-defined sequence can indicate a subset of the plurality of memory shapes and a subset of the contiguous columns or the contiguous rows of the plurality of memory shapes.

At least one embodiment can include receiving a user-defined quantity of contiguous rows of a memory shape and a user-defined quantity of contiguous columns of the memory shape, receiving a user-defined quantity of memory shapes, allocating a contiguous, multidimensional portion of a single physical memory component of a memory device according to the user-defined quantities, storing a plurality of data elements in the contiguous, multidimensional portion such that the plurality of data elements are in a common orientation, and performing an operation on each of the plurality of data elements according to a user-defined sequence. The user-defined sequence can include performing the operation on each of the plurality of data elements of a first memory shape and subsequently performing the operation on each of the plurality of data elements of a second memory shape.

The plurality of data elements can be oriented vertically such that one of the plurality of data elements can be stored in each of the contiguous columns as illustrated in FIG. 5. The user-defined sequence can include performing the operation on a first data element of a respective first column of the first memory shape, subsequently performing the operation on a second data element of a respective second column of the respective first memory shape, subsequently performing the operation on a third data element of a respective first column of the second memory shape, and subsequently performing the operation on a fourth data element of a respective second column of the second memory shape. The respective first column of a memory shape can be adjacent to the respective second column of the memory shape.

Figure 6:
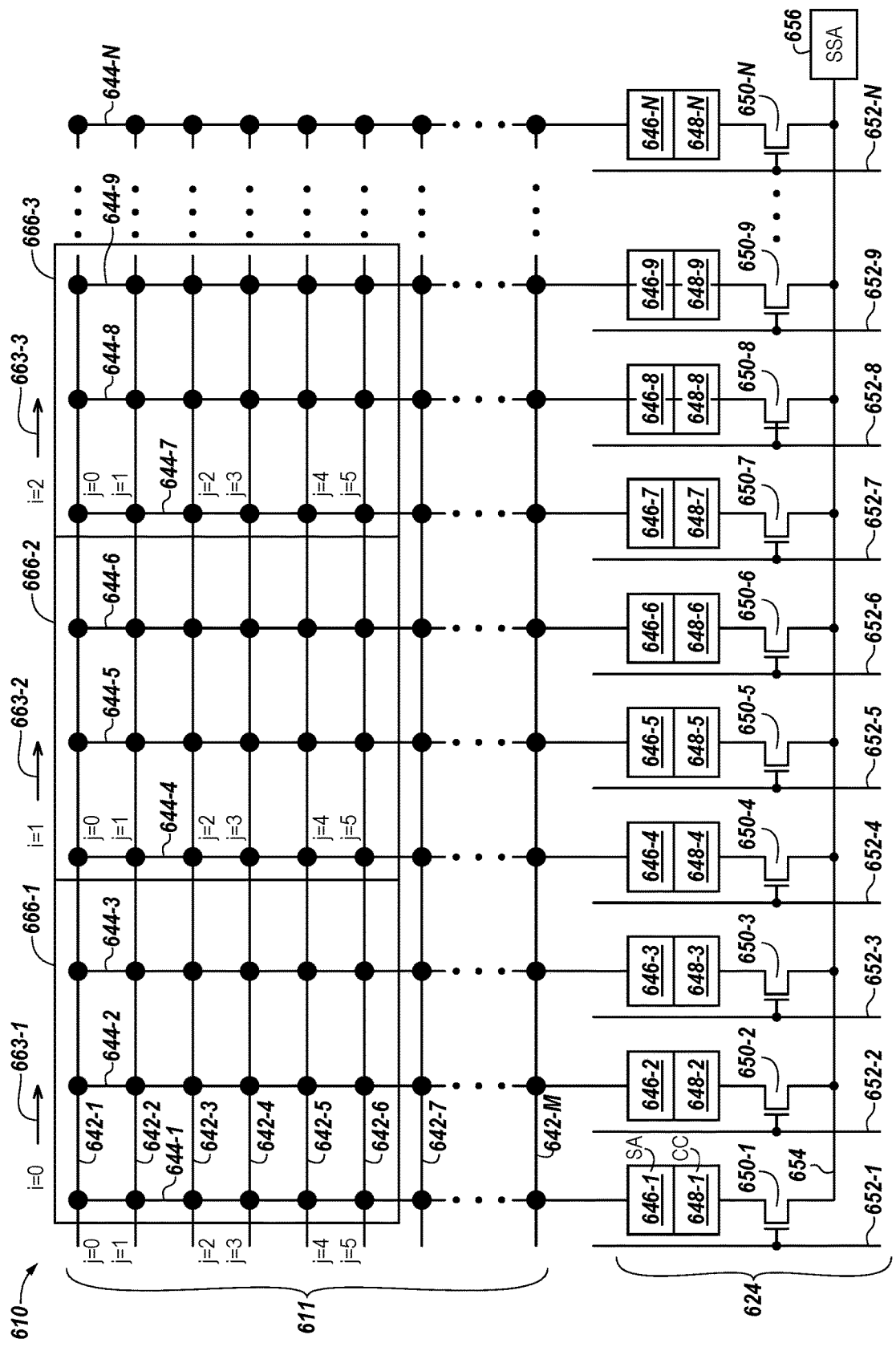
FIG. 6 illustrates a schematic diagram of a portion of a memory device illustrating a multidimensional, contiguous, physical allocation according to an array of memory shapes for an outer loop optimization in accordance with a number of embodiments of the present disclosure.

The plurality of data elements can be oriented horizontally such that one of the plurality of data elements can be stored in each of the contiguous rows as illustrated in FIG. 6. The user-defined sequence can include performing the operation on a first data element of a respective first row of the first memory shape, subsequently performing the operation on a second data element of a respective second row of the respective first memory shape, subsequently performing the operation on a third data element of a respective first row of the second memory shape, and subsequently performing the operation on a fourth data element of a respective second row of the second memory shape. The respective first row of a memory shape can be adjacent to the respective second row of the memory shape.

FIG. 5 illustrates three memory shapes 564-1 to 564-3, which can be analogous to the plurality of the memory shapes 464-1 to 464-3 illustrated in FIG. 4. Each of the memory shapes 564-1 to 564-3 has a vertical major dimension as indicated by the arrows 561-1 to 561-3. A first index (e.g., "i") can correspond to a particular one of the memory shapes 564-1 to 564-3. For example, i=0 can correspond to the memory shape 564-1, i=1 can correspond to the memory shape 564-2, and i=2 can correspond to the memory shape 564-3. A second index (e.g., "j") can correspond to a particular sentence of the memory shapes 564-1 to 564-3. As used herein, a "sentence" refers to a column of a memory shape if the memory shape has a vertical major dimension or a row of a memory shape if the memory shape has a horizontal major dimension. As illustrated in FIG. 5, j=0 can correspond to a respective first column of the memory shape 564-1 (e.g, for i=0, the memory cells (represented by the filled-in circles) coupled to the sense line 544-1 and the access lines 542-1 to 542-6), j=1 can correspond to a respective second column of the memory shape 564-1 (e.g, for i=0, the memory cells coupled to the sense line 544-2 and the access lines 542-1 to 542-6), and j=2 can correspond to a respective third column of the memory shape 564-1 (e.g, for i=0, the memory cells coupled to the sense line 544-3 and the access lines 542-1 to 542-6). A data element can be stored in each column of a memory shape.

By using the first and second indices i and j, an operation can be performed on each data element stored in the columns of a first memory shape (e.g., the memory shape 564-1) before the operation is performed on each data element stored in the columns of a second memory shape (e.g., the memory shape 564-2). Alternatively, the first and second indices i and j can be used to perform an operation on a subset of the memory shapes, a subset of the data elements stored in the memory shapes, or both. Thus, each memory shape can be addressed individually such that the operation is performed on a group of the data elements of a particular memory shape of the plurality of memory shapes. The address can be a vector-style address that includes a starting address and an ending address. The vector-style address can include a starting address and an offset.

A user can use loop constructs that can be interpreted by a compiler to generate a single SIMD operation for an outer loop optimization. By using multidimensional, contiguous, physical allocation via memory shapes, a compiler can perform transformations and optimizations on code that would otherwise be difficult or unsafe despite the explicit definitions of stride and addressing of the compiler.

An example of pseudo code for an outer loop optimization can be summarized as follows:

```
int i, j;
for( i=0; i<2; i++){        //-- for each memory shape
  for( j=0; j<2; j++){      //-- for each sentence of a memory shape
    //-- perform an operation on mydata[i].sentence[j]
  }
}
```

According to the user-defined sequence of the example pseudo code above, an operation is performed on each data element, corresponding to each sentence j=0 through j=2, of a first memory shape (e.g., the memory shape 564-1), then on each data element, corresponding to each sentence j=0 through j=2, of a second memory shape (e.g., the memory shape 564-2), and then on each data element, corresponding to each sentence j=0 through j=2, of a third memory shape (e.g., the memory shape 564-3). The above pseudo code can used with a plurality of memory shapes that have a vertical major dimension as illustrated in FIG. 5 or a horizontal major dimension as illustrated in FIG. 6.

FIG. 6 illustrates a schematic diagram of a portion of a memory device illustrating a multidimensional, contiguous, physical allocation according to a plurality of memory shapes for an outer loop optimization in accordance with a number of embodiments of the present disclosure. FIG. 6 illustrates three memory shapes 666-1 to 666-3, which can be analogous to the plurality of the memory shapes 464-1 to 464-3 illustrated in FIG. 4 except each of the memory shapes 666-1 to 666-3 has a horizontal major dimension as indicated by the arrows 666-1 to 666-3. A first index (e.g., "i") can correspond to a particular one of the memory shapes 666-1 to 666-3. For example, i=0 can correspond to the memory shape 666-1, i=1 can correspond to the memory shape 666-2, and i=2 can correspond to the memory shape 666-3. A second index (e.g., "j") can correspond to a particular sentence of the memory shapes 666-1 to 666-3. As illustrated in FIG. 6, j=0 can correspond to a respective first row of the memory shape 666-1 (e.g, for i=0, the memory cells (represented by the filled-in circles) coupled to the access line 642-1 and the sense lines 644-1 to 644-3), j=1 can correspond to a respective second row of the memory shape 666-1 (e.g, for i=0, the memory cells coupled to the access line 642-2 and the sense lines 644-1 to 644-3), j=2 can correspond to a respective third row of the memory shape 666-1 (e.g, for i=0, the memory cells coupled to the access line 642-3 and the sense lines 644-1 to 644-3), j=3 can correspond to a respective fourth column of the memory shape 666-1 (e.g, for i=0, the memory cells coupled to the access line 642-4 and the sense lines 644-1 to 644-3), j=4 can correspond to a respective fifth column of the memory shape 666-1 (e.g, for i=0, the memory cells coupled to the access line 642-5 and the sense lines 644-1 to 644-3), and j=5 can correspond to a respective sixth column of the memory shape 666-1 (e.g, for i=0, the memory cells coupled to the access line 642-6 and the sense lines 644-1 to 644-3). A data element can be stored in each row of a memory shape.

By using the first and second indices i and j, an operation can be performed on each data element stored in the rows of a first memory shape (e.g., the memory shape 666-1) before the operation is performed on each data element stored in the rows of a second memory shape (e.g., the memory shape 666-2). Alternatively, the first and second indices i and j can be used to perform an operation on a subset of the memory shapes, a subset of the data elements stored in the memory shapes, or both. Thus, each memory shape can be addressed individually such that the operation is performed on a group of the data elements of a particular memory shape of the plurality of memory shapes. The address can be a vector-style address that includes a starting address and an ending address. The vector-style address can include a starting address and a stride.

Figure 7:
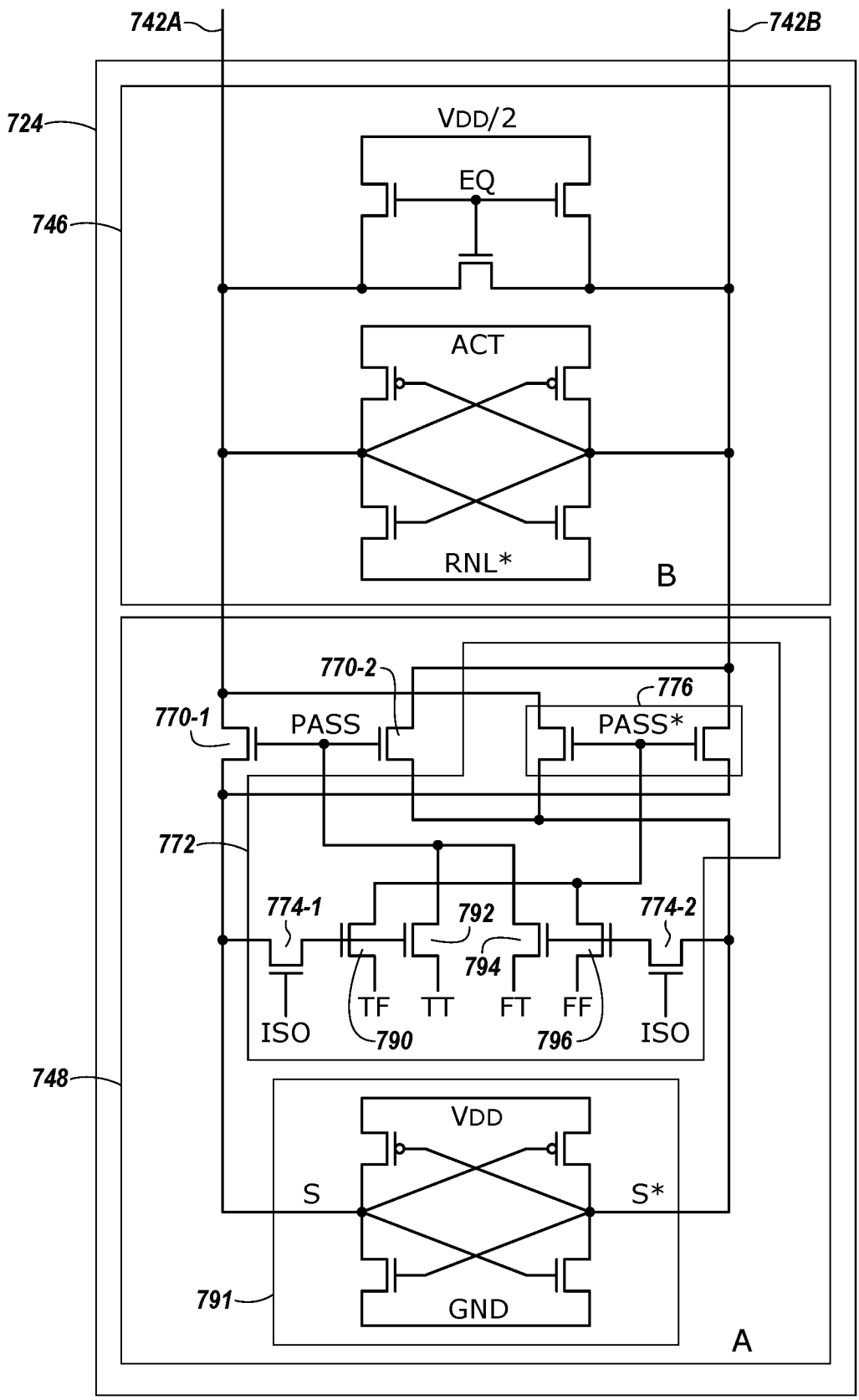
FIG. 7 is a schematic diagram illustrating sensing circuitry in accordance with a number of embodiments of the present disclosure.

FIG. 7 is a schematic diagram illustrating sensing circuitry 724 in accordance with a number of embodiments of the present disclosure. The sensing circuitry 724 can be analogous to the sensing circuitry 124 illustrated in FIG. 1. The sensing circuitry 724 can include a sense amplifier 746, which can be analogous to any of the sense amplifiers 246 illustrated in FIG. 2, and a compute component 748, which can be analogous to any of the compute components 248 illustrated in FIG. 2. FIG. 7 shows a sense amplifier 746 coupled to a pair of complementary sense lines 742*a* and 742*b* (which as a pair can be analogous to any of the sense lines 242 illustrated in FIG. 2). The compute component 748 is coupled to the sense amplifier 746 via the pass transistors 770-1 and 770-2. The gates of the pass transistors 770-1 and 770-2 can be controlled by a logical operation selection logic signal, PASS, which can be output from logical operation selection logic 772. FIG. 7 shows the compute component 748 labeled "A" and the sense amplifier 746 labeled "B" to indicate that the data value stored in the compute component 748 is the "A" data value and the data value stored in the sense amplifier 746 is the "B" data value shown in the logic tables illustrated with respect to FIG. 8.

The selectable logical operation selection logic 772 includes the swap transistors 776, as well as logic to drive the swap transistors 776. The logical operation selection logic 772 includes four logic selection transistors: a logic selection transistor 790 coupled between the gates of the swap transistors 776 and a TF signal control line, a logic selection transistor 792 coupled between the gates of the pass transistors 770-1 and 770-2 and a TT signal control line, a logic selection transistor 794 coupled between the gates of the pass transistors 770-1 and 770-2 and a FT signal control line, and a logic selection transistor 796 coupled between the gates of the swap transistors 776 and a FF signal control line. Gates of the logic selection transistors 790 and 792 are coupled to the true digit line 742*a* through isolation transistor 774-1 (having a gate coupled to an ISO signal control line). Gates of the logic selection transistors 794 and 796 are coupled to the complementary digit line 742*b* through the isolation transistor 774-2 (also having a gate coupled to an ISO signal control line).

As illustrated in FIG. 7, logic selection control signals can be applied to the logic selection transistors 790, 792, 794, and 796 to perform a particular logical operation. Operation of the logic selection transistors 790 and 796 are based on the state of the TF and FF selection signals and the data values on the respective complementary digit lines at the time the ISO signal is activated/deactivated. The logic selection transistors 790 and 796 also operate in a manner to control the swap transistors 776. For instance, to OPEN (e.g., turn on) the swap transistors 776, either the TF control signal is activated (e.g., high) with data value on the true digit line 742*a* being "1," or the FF control signal is activated (e.g., high) with the data value on the complement digit line 742*b* being "1." If either the respective control signal or the data value on the corresponding digit line (e.g., the digit line to which the gate of the particular logic selection transistor is coupled) is not high, then the swap transistors 776 will not be OPENed despite conduction of a particular logic selection transistor 790 and 796.

The PASS *control signal is not necessarily complementary to the PASS control signal. It is possible for the PASS and PASS * control signals to both be activated or both be deactivated at the same time. However, activation of both the PASS and PASS * control signals at the same time shorts the pair of complementary digit lines 742*a* and 742*b* together. Logical operations results for the sensing circuitry illustrated in FIG. 7 are summarized in the logic table illustrated in FIG. 8.

The sense amplifier 746 can, in conjunction with the compute component 748, be operated to perform various logical operations using data from an array as an input. In a number of embodiments, the result of a logical operation can be stored back to the array without transferring the data via a digit line address access (e.g., without firing a column decode signal such that data is transferred to circuitry external from the array and sensing circuitry via local I/O lines). As such, a number of embodiments of the present disclosure can enable performing logical operations and compute functions associated therewith using less power than various previous approaches. Additionally, since a number of embodiments can eliminate the need to transfer data across I/O lines in order to perform compute functions (e.g., between memory and discrete processor), a number of embodiments can enable an increased parallel processing capability as compared to previous approaches.

The sense amplifier 746 can further include equilibration circuitry, which can be configured to equilibrate the pair of complementary digit lines 742a and 742b. In this example, the equilibration circuitry comprises a transistor coupled between the pair of complementary digit lines 742a and 742b. The equilibration circuitry also comprises transistors each having a first source/drain region coupled to an equilibration voltage (e.g., $V_{DD}/2$), where $V_{DD}$ is a supply voltage associated with the array. A second source/drain region of a transistor can be coupled to the digit line 742a, and a second source/drain region of a transistor can be coupled to the digit line 742b. Gates of the transistors can be coupled together, and to an equilibration (EQ) control signal line. As such, activating EQ enables the transistors, which effectively shorts the pair of complementary digit lines 742a and 742b together and to the equilibration voltage (e.g., $V_{DD}/2$).

Although FIG. 5 shows the sense amplifier 746 comprising the equilibration circuitry, embodiments are not so limited, and the equilibration circuitry may be implemented discretely from the sense amplifier 746, implemented in a different configuration than that shown in FIG. 7, or not implemented at all.

As shown in FIG. 7, the compute component 748 can also comprise a latch 791. The latch 791 can include a pair of cross coupled p-channel transistors (e.g., PMOS transistors) having their respective sources coupled to a supply voltage (e.g., $V_{DD}$). The latch 791 can include a pair of cross coupled n-channel transistors (e.g., NMOS transistors) having their respective sources selectively coupled to a reference voltage (e.g., ground), such that the latch 791 is continuously enabled. The configuration of the compute component 748 is not limited to that shown in FIG. 7.

FIG. 8 is a logic table illustrating selectable logic operation results implemented by sensing circuitry (e.g., the sensing circuitry 724 shown in FIG. 7) in accordance with a number of embodiments of the present disclosure. The four logic selection control signals (e.g., TF, TT, FT, and FF), in conjunction with a particular data value present on the complementary digit lines (e.g., the pair of complementary digit lines 742a and 742b shown in FIG. 7), can be used to select one of a plurality of logical operations to implement involving the starting data values stored in the sense amplifier 746 and the compute component 748. The four logic selection control signals (e.g., TF, TT, FT, and FF), in conjunction with a particular data value present on the complementary digit lines (e.g., on nodes S and S*), controls the pass transistors 770-1 and 770-2 and swap transistors 776, which in turn affects the data value in the compute component 748 and/or the sense amplifier 746 before/after firing. The capability to selectably control the swap transistors 776 facilitates implementing logical operations involving inverse data values (e.g., inverse operands and/or inverse result), among others.

Logic Table 8-1 illustrated in FIG. 8 shows the starting data value stored in the compute component 748 shown in column A at 871, and the starting data value stored in the sense amplifier 746 shown in column B at 873. The other three column headings in Logic Table 8-1 refer to the state of the pass transistors 770-1 and 770-2 and the swap transistors 776, which can respectively be controlled to be OPEN or CLOSED depending on the state of the four logic selection control signals (e.g., TF, TT, FT, and FF), in conjunction with a particular data value present on the pair of complementary digit lines 742a and 742b when the ISO control signal is asserted. The "NOT OPEN" column 875 corresponds to the pass transistors 770-1 and 770-2 and the swap transistors 776 both being in a non-conducting condition. The "OPEN TRUE" column 877 corresponds to the pass transistors 770-1 and 770-2 being in a conducting condition. The "OPEN INVERT" column 879 corresponds to the swap transistors 776 being in a conducting condition. The configuration corresponding to the pass transistors 770-1 and 770-2 and the swap transistors 776 both being in a conducting condition is not reflected in Logic Table 8-1 since this results in the digit lines being shorted together.

Via selective control of the pass transistors 770-1 and 770-2 and the swap transistors 776, each of the three columns 875, 877, and 879 of the upper portion of Logic Table 8-1 can be combined with each of the three columns 875, 877, and 879 of the lower portion of Logic Table 8-1 to provide nine (e.g., 3×3) different result combinations, corresponding to nine different logical operations, as indicated by the various connecting paths shown at 881. The nine different selectable logical operations that can be implemented by the sensing circuitry 724 are summarized in Logic Table 8-2.

The columns of Logic Table 8-2 show a heading 883 that includes the states of logic selection control signals (e.g., FF, FT, TF, TT). For example, the state of a first logic selection control signal (e.g., FF) is provided in the row 884, the state of a second logic selection control signal (e.g., FT) is provided in the row 885, the state of a third logic selection control signal (e.g., TF) is provided in the row 886, and the state of a fourth logic selection control signal (e.g., TT) is provided in the row 887. The particular logical operation corresponding to the results is summarized in the row 888.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
receiving a user definition of a memory shape including:
a quantity of contiguous columns of a memory array;
a quantity of contiguous rows of the memory array; and
a major dimension of the memory shape corresponding to a dimension of the memory shape by which data is written to the contiguous columns and contiguous rows of the memory array;
allocating a multidimensional, contiguous, physical portion of the memory array according to the user definition, wherein the physical portion comprises a plurality of memory cells;
storing a first data element and a second data element in the multidimensional, contiguous, physical portion corresponding to the memory shape;
storing only the first data element in a first column of the multidimensional, contiguous, physical portion; and
storing only the second data element in a second column of the multidimensional, contiguous, physical portion, wherein the first column is adjacent to the second column.

2. The method of claim 1, further comprising performing an operation on the first data element or the second data element using sensing circuitry coupled to the memory array.

3. The method of claim 1, wherein allocating the multidimensional, contiguous, physical portion comprises allocating the multidimensional, contiguous, physical portion of a single physical memory component of the memory array.

4. A method, comprising:
receiving a first user definition of a memory shape including to a major dimension corresponding to a dimension of the memory shape by which data is written to the memory shape;
receiving a second user definition specifying a plurality of the memory shape;
allocating physically contiguous columns and contiguous rows of memory cells of a memory array according to the first and second user definitions;
storing only a first data element in a first column of the physically contiguous columns and contiguous rows of the memory cells; and
storing only a second data element in a second column of the physically contiguous columns and contiguous rows of the memory cells, wherein the first column is adjacent to the second column.

5. The method of claim 4, further comprising mapping existing data to the plurality of the memory shape.

6. The method of claim 5, wherein mapping the existing data comprises mapping the existing data from memory, other than the memory array, to the plurality of the memory shape.

7. The method of claim 5, wherein mapping the existing data comprises mapping the existing data from the memory array to the plurality of the memory shape.

8. An apparatus, comprising:
a memory device; and
a host coupled to the memory device, wherein the host is configured to:
receive a first user definition of a memory shape including to a major dimension corresponding to a dimension of the memory shape by which data is written to the memory shape;
receive a second user definition specifying a plurality of the memory shape;
allocate contiguous columns and contiguous rows of memory cells of a single physical memory component of the memory device according to the first and second user definitions;
store a plurality of data elements contiguously in the contiguous columns and the contiguous rows of the memory cells according to the first and second user definitions and the major dimension;
store only a first data element in a first column of the contiguous columns and the contiguous rows of the memory cells; and
store only a second data element in a second column of the contiguous columns and the contiguous rows of the memory cells, wherein the first column is adjacent to the second column.

9. The apparatus of claim 8, wherein the single physical memory component is a single memory bank.

10. The apparatus of claim 8, wherein the host is configured to allocate the contiguous columns and contiguous rows of memory cells of the single physical memory component such that each of the plurality of the memory shape comprises memory cells coupled to common access lines.

11. The apparatus of claim 8, further comprising sensing circuitry coupled to the single physical memory component, wherein the sensing circuitry is configured to perform an operation on at least one of the plurality of data elements.

12. The apparatus of claim 11, wherein the sensing circuitry is configured to:
perform the operation on a third data element of a first one of the memory shapes; and
perform the operation on a fourth data element of a second one of the memory shapes.

13. The apparatus of claim 11, wherein the sensing circuitry is configured to:
perform the operation on the first data element of a particular one of the memory shapes; and
perform the operation on the second data element of the particular one of the memory shapes.

14. The apparatus of claim 11, wherein the sensing circuitry is configured to perform the operation on the plurality of data elements concurrently.

15. The apparatus of claim 11, wherein the host is configured to address each memory shape individually such that the operation is performed on a portion of the plurality data elements stored in a particular memory shape.

16. The apparatus of claim 15, wherein the host is configured to address each memory shape with a vector style address.

17. The apparatus of claim 8, wherein the host includes a memory allocation application program interface (API) configured to receive the first and second user definitions.

18. A method, comprising:
receiving a user definition of a memory shape including:
a quantity of contiguous columns of a memory array;
a quantity of contiguous rows of the memory array; and
a major dimension of the memory shape corresponding to a dimension of the memory shape by which data is written to the contiguous columns and contiguous rows of the memory array;

allocating a multidimensional, contiguous, physical portion of the memory array according to the user definition, wherein the physical portion comprises a plurality of memory cells;

storing a first data element and a second data element in the multidimensional, contiguous, physical portion corresponding to the memory shape;

storing only the first data element in a first row of the multidimensional, contiguous, physical portion; and storing only the second data element in a second row of the multidimensional, contiguous, physical portion, wherein the first row is adjacent to the second row.

19. A method, comprising:

receiving a first user definition of a memory shape including to a major dimension corresponding to a dimension of the memory shape by which data is written to the memory shape;

receiving a second user definition specifying a plurality of the memory shape;

allocating physically contiguous columns and contiguous rows of memory cells of a memory array according to the first and second user definitions;

storing only a first data element in a first row of the physically contiguous columns and contiguous rows of the memory cells; and storing only a second data element in a second row of the physically contiguous columns and contiguous rows of the memory cells, wherein the first row is adjacent to the second row.

20. An apparatus, comprising:

a memory device; and a host coupled to the memory device, wherein the host is configured to:

receive a first user definition of a memory shape including to a major dimension corresponding to a dimension of the memory shape by which data is written to memory cells of the memory shape;

receive a second user definition of specifying a plurality of the memory shape;

allocate contiguous columns and contiguous rows of memory cells of a single physical memory component of the memory device according to the first and second user definitions;

store a plurality of data elements contiguously in the contiguous columns and the contiguous rows of the memory cells according to the first and second user definitions and the major dimension;

store only a first data element in a first row of the contiguous columns and the contiguous rows of the memory cells; and store only a second data element in a second row of the contiguous columns and the contiguous rows of the memory cells, wherein the first row is adjacent to the second row.

* * * * *